US011349663B2

(12) United States Patent
Banerjee et al.

(10) Patent No.: US 11,349,663 B2
(45) Date of Patent: May 31, 2022

(54) SECURE WORKLOAD CONFIGURATION

(71) Applicant: International Business Machines Corporation, Armonk, NY (US)

(72) Inventors: Pradipta Banerjee, Bangalore (IN); Harshal Patil, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 349 days.

(21) Appl. No.: 16/668,047

(22) Filed: Oct. 30, 2019

(65) Prior Publication Data
US 2021/0135871 A1    May 6, 2021

(51) Int. Cl.
*H04L 9/32* (2006.01)
*G06F 9/455* (2018.01)
*H04L 9/30* (2006.01)

(52) U.S. Cl.
CPC ............ *H04L 9/3226* (2013.01); *G06F 9/455* (2013.01); *H04L 9/30* (2013.01)

(58) Field of Classification Search
CPC .......... H04L 9/3226; H04L 9/30; G06F 9/455
See application file for complete search history.

(56) References Cited

U.S. PATENT DOCUMENTS

| 9,696,985 B1* | 7/2017 | Gupta | G06F 8/65 |
| 10,356,206 B2* | 7/2019 | Chen | H04L 67/10 |
| 10,929,118 B2* | 2/2021 | Zolotow | G06F 8/65 |
| 11,023,218 B1* | 6/2021 | Lu | G06F 21/577 |
| 11,074,058 B1* | 7/2021 | Mowatt | G06F 3/04817 |
| 11,209,147 B2* | 12/2021 | Aas | F21V 23/003 |
| 11,228,646 B2* | 1/2022 | Murthy | H04L 67/20 |
| 11,269,616 B1* | 3/2022 | Schumaker | G06F 8/71 |
| 2008/0098462 A1* | 4/2008 | Carter | H04L 67/1095 726/4 |
| 2014/0089495 A1* | 3/2014 | Akolkar | H04L 47/823 709/224 |
| 2014/0201741 A1 | 7/2014 | Govindan et al. | |

(Continued)

OTHER PUBLICATIONS

Notification of Transmittal of The International Search Report and The Written Opinion of the International Searching Authority, or The Declaration, dated Jan. 21, 2021, 10 pages.

(Continued)

*Primary Examiner* — Yonas A Bayou
(74) *Attorney, Agent, or Firm* — Stosch Sabo

(57) ABSTRACT

Described are techniques for secure workload configuration including a method comprising receiving a workload definition file at a worker node and from a master node, where the workload definition file comprises an encrypted immutable definition, a partially immutable definition with a predefined range of values and a first value modified by the master node, and a variable definition with a second value modified by the master node. The method further comprises decrypting, by the worker node, the encrypted immutable definition to generate a decrypted immutable definition. The method further comprises verifying, by the worker node, that the first value satisfies the predefined range of values. The method further comprises, in response to decrypting the encrypted immutable definition and verifying that the first value satisfies the predefined range of values, executing a workload based on the workload definition file in a virtual computing environment.

20 Claims, 8 Drawing Sheets

(56) References Cited

U.S. PATENT DOCUMENTS

| | | |
|---|---|---|
| 2016/0048408 A1 | 2/2016 | Madhu et al. |
| 2017/0134301 A1* | 5/2017 | Chen ...................... H04L 67/10 |
| 2017/0155672 A1 | 6/2017 | Muthukrishnan et al. |
| 2017/0192769 A1* | 7/2017 | Gupta ..................... G06F 11/14 |
| 2019/0018671 A1* | 1/2019 | Zhu ..................... H04L 67/1008 |
| 2019/0149425 A1 | 5/2019 | Larish et al. |
| 2019/0229998 A1 | 7/2019 | Cattoni |

OTHER PUBLICATIONS

Menezes et al., "Chapter 11—Digital Signatures", Handbook of Applied Cryptography, Section 11.2.3, Jan. 1, 1997, 65 pages.

Mell et al., "The NIST Definition of Cloud Computing", Recommendations of the National Institute of Standards and Technology, Sep. 2011, 7 pages.

\* cited by examiner

SECURE WORKLOAD CONFIGURATION

BACKGROUND

The present disclosure relates to workload configurations, and, more specifically, to improving security of workload configurations.

Computational workloads can be deployed in virtual computing environments. Virtual computing environments can refer to the emulation and provisioning of computer functionality. Computer functionality can be emulated by generating one or more virtual machines (VMs) or containers from a single set of hardware or from numerous disparate sets of hardware. Further, the emulated computer functionality can be provisioned on an as-needed basis to an entity that is geographically distant from the location or locations of the hardware used to generate the emulated computer functionality.

SUMMARY

Aspects of the present disclosure are directed toward a method comprising receiving a workload definition file at a worker node and from a master node, where the workload definition file comprises an encrypted immutable definition, a partially immutable definition with a predefined range of values and a first value modified by the master node, and a variable definition with a second value modified by the master node. The method further comprises decrypting, by the worker node, the encrypted immutable definition to generate a decrypted immutable definition. The method further comprises verifying, by the worker node, that the first value satisfies the predefined range of values. The method further comprises, in response to decrypting the encrypted immutable definition and verifying that the first value satisfies the predefined range of values, executing a workload based on the workload definition file in a virtual computing environment.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
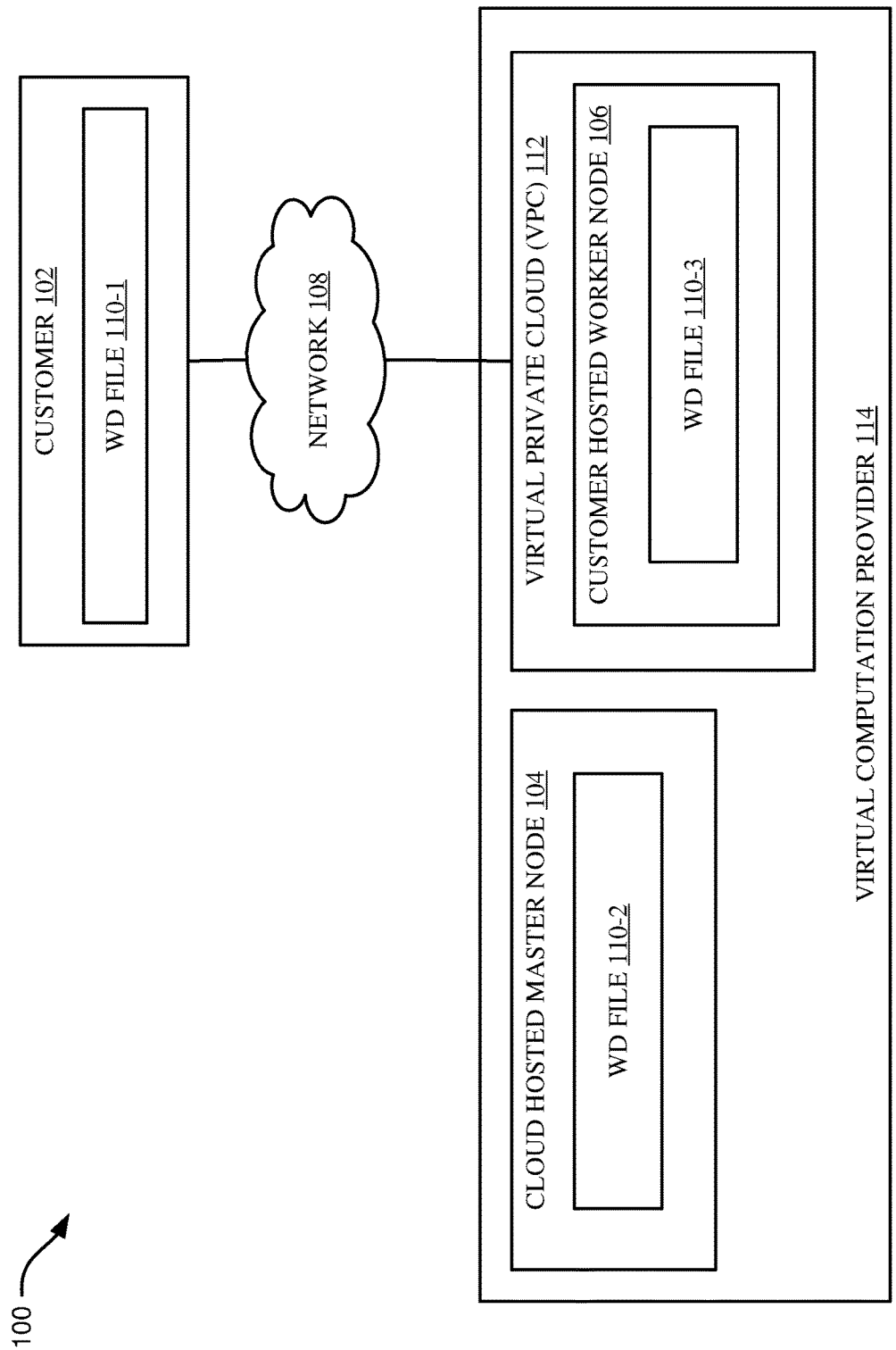
FIG. 1 illustrates a block diagram of an example computing environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward workload configurations, and, more specifically, to improving security of workload configurations. While not limited to such applications, embodiments of the present disclosure may be better understood in light of the aforementioned context.

Customized applications and/or workloads can be deployed in a virtual computing environment. Such workloads can include, for example, stateless applications, stateful applications, batch jobs, daemons, and/or other workloads. A customer can define workloads in a workload definition (WD) file using a programming language such as, but not limited to, JavaScript® Object Notation (JSON) or YAML (a recursive acronym for "YAML Ain't Markup Language"). The WD file can be implemented on a worker node in a Virtual Private Cloud (VPC) owned by the customer. However, a control plane (e.g., cloud provider) hosting the VPC can modify the WD file in order to schedule deployment, improve deployment efficiency, and/or improve deployment reliability. Kubernetes® (k8s) is one example of a container-orchestration system that functions at the interface of a cloud provider's virtual resources and a customer's workloads. Kubernetes® is an open-source container-orchestration system for automating workload deployment, scaling, and management. Kubernetes® can be used in conjunction with container tools, such as, for example, Docker®.

Disadvantageously, the ability of the control plane to modify the WD file introduces a security risk to the customer insofar as a malicious actor can infiltrate, disrupt, steal, compromise, alter, or otherwise negatively influence a worker node via the control plane (e.g., if the malicious actor compromises a cloud provider's security infrastructure and gains access and/or privileges in the control plane). As one example, consider the hypothetical situation in which a customer requests to deploy a container image A, but a malicious actor with administrator privileges in the master node (e.g., orchestrator node) of the control plane modifies the workload configuration so that the worker node deploys a compromised container image B.

One possible solution for preventing malicious access to the WD file by the control plane is to encrypt the entire WD file so that it cannot be compromised at the control plane. However, this is problematic insofar as the control plane utilizes some of the data points in the WD file (even modifying some of the data points in the WD file) in order to efficiently and effectively schedule the workload. Thus, encrypting the entirety of the WD file can result in performance degradation.

In light of the aforementioned challenges, aspects of the present disclosure are directed to a selectively encrypted WD file, where the selectively encrypted WD file includes immutable, partially immutable, and variable definitions. The immutable definitions are encrypted and are unalterable by the master node during scheduling of the workload. The partially immutable definitions are associated with predefined ranges, thus allowing the master node to make appropriate and reasonable adjustments to the partially immutable definitions for efficient and effective scheduling of the workload. Finally, the variable definitions are fully configurable by the master node as they may have relatively less security risk for the customer and may realize improved workload processing when adjusted by the master node as needed.

Thus, aspects of the present disclosure advantageously improve security for workloads executed in VPC environments while preserving an appropriate amount of flexibility for maintaining adequate scheduling efficiency and/or deployment performance. Improved security is realized by the immutable portions of a WD file that are unalterable by the master node and/or the partially immutable portions of the WD file that are alterable by the master node within predefined ranges. Improved performance is preserved by enabling the master node to modify the variable portions of the WD file and the partially immutable portions of the WD file within the predefined ranges.

Referring now to FIG. 1, illustrated is an example computing environment 100, in accordance with some embodiments of the present disclosure. Computing environment 100 includes a customer 102, a cloud hosted master node 104, and a customer hosted worker node 106 communicatively coupled to one another. The cloud hosted master node 104 can be associated with a virtual computation provider 114. The virtual computation provider 114 can be a vendor of virtual computing (e.g., a public, private, and/or hybrid cloud provider). The cloud hosted master node 104 can be configured to monitor, manage, and/or schedule workloads provided by customers (e.g., customer 102) on computational resources associated with the virtual computation provider 114 (e.g., the customer hosted worker node 106). The cloud hosted master node 104 can represent a control plane, management node, or orchestrator node of the virtual computation provider 114.

The customer hosted worker node 106 can reside within a virtual private cloud (VPC) 112. The VPC 112 can refer to an on-demand pool of shared computing resources reserved for a respective customer 102 and isolated from other shared resources associated with the virtual computation provider 114. The VPC 112 can thus enable a customer 102 to utilize provisioned computing resources with a relatively higher level of security. The customer hosted worker node 106 (also referred to as a worker or a minion) can be a physical or virtual machine for deploying workloads (e.g., containers). Although a single customer hosted worker node 106 is shown in VPC 112, this is only for illustrative purposes, and numerous customer hosted worker nodes 106 can exist within the VPC 112. Likewise, although a single VPC 112 is shown, this is also only for illustrative purposes and numerous VPCs 112, each associated with a respective customer 102, can be hosted by the virtual computation provider 114.

The customer 102 can refer to a user or an administrator that can access the VPC 112 through a network 108 (such as the Internet) using a secure connection, such as a virtual private network (VPN) connection. As one example, a business can have an intranet network with various hardware resources at a first location. The business can purchase additional computational resources in the form of VPC 112 from the virtual computation provider 114. The business can utilize the VPC 112 by connecting with VPC 112 via the network 108. Thus, the customer 102 can lease computational resources from the virtual computation provider 114, such as, for example, the VPC 112 and the customer hosted worker node 106.

The customer 102 can define a WD file 110-1 (generically referred to as WD file 110) at a first time. WD file 110-1 can define a workload or application that the customer 102 wishes to deploy on the VPC 112. WD file 110-1 can be written in, for example JSON, YAML, or a different computer readable language. WD file 110-1 can include one or more immutable definitions, one or more partially immutable definitions, and one or more variable definitions. The one or more immutable definitions can be associated with an encryption scheme and encrypted according to the encryption scheme. The one or more partially immutable definitions can be associated with predefined ranges. The predefined ranges can define acceptable variations in the partially immutable definitions that can be made by the cloud hosted master node 104 for efficient scheduling of the WD file 110 on the customer hosted worker node 106. The one or more variable definitions can be altered by the cloud hosted master node 104 without any limitations imposed by the customer 102.

The customer 102 provides the WD file 110-1 to the cloud hosted master node 104. As previously discussed, the cloud hosted master node 104 cannot alter the one or more immutable definitions in the WD file 110-1 insofar as those definitions are encrypted and the cloud hosted master node 104 cannot decrypt the encrypted immutable definitions. Further, in some embodiments, the cloud hosted master node 104 cannot read the immutable definitions insofar as they are replaced by a hash of the immutable definitions after the immutable definitions are encrypted. Thus, in various embodiments, the immutable definitions are (1) unalterable by the cloud hosted master node 104, or (2) unalterable and unreadable by the cloud hosted master node 104. Each of the first and second examples are beneficial in preventing a malicious cloud hosted master node 104 from corrupting immutable definitions in the WD file 110-1. The second example is further beneficial in preventing a malicious cloud hosted master node 104 from reading private, sensitive, and/or confidential information stored in the immutable definitions.

The cloud hosted master node 104 can alter the partially immutable definitions within the predefined ranges and/or alter the variable definitions. Alterations to the partially immutable definitions within the predefined ranges and/or alterations to the variable definitions can be made by the cloud hosted master node 104 for improving efficiency, reliability, availability, or other performance characteristics associated with scheduling a workload in the VPC 112.

Once the cloud hosted worker node 104 makes any necessary adjustments to the WD file 110-1, the cloud hosted master node 104 stores a WD file 110-2, where the WD file 110-2 can exhibit altered partially immutable definitions within the predefined ranges and/or altered variable definitions relative to the WD file 110-1. Meanwhile, the one or more immutable definitions in WD file 110-2 remain encrypted.

The cloud hosted master node 104 can provide the WD file 110-2 to the customer hosted worker node 106 as part of scheduling the workload associated with WD file 110-2 for execution by the customer hosted worker node 106. The customer hosted worker node 106 receives the WD file 110-2 and decrypts the one or more immutable portions of the WD file 110-2. Furthermore, the customer hosted worker node 106 can verify that each of the partially immutable definitions are within the predefined ranges. Upon decryption and verification, the customer hosted worker node 106 can store a WD file 110-3, where WD file 110-3 can be different from WD file 110-2 insofar as the one or more immutable definitions are decrypted and the one or more partially immutable definitions are verified to be within the predefined ranges. The customer hosted worker node 106 can then deploy the workload by executing the WD file 110-3 using the computational resources associated with the customer hosted worker node 106.

Although not explicitly shown, each of the customer 102, the cloud hosted master node 104, and the customer hosted worker node 106 can include a variety of additional components. For example, the cloud hosted master node 104 can include a daemon (e.g., etcd) configured to run across all computers in a cluster for providing a dynamic configuration registry. The cloud hosted master node 104 can further include an Application Programming Interface (API) server which processes and validates Representational State Transfer (REST) requests and updates states of different API objects in etcd. The cloud hosted master node 104 can further include a scheduler for monitoring resource supply on various worker nodes and matching available resources with pending workloads.

The customer hosted worker node 106 can include a Kubelet for starting, stopping, and maintaining workloads running on the customer hosted worker node 106. The customer hosted worker node 106 can further include a Kube-proxy for routing traffic into, out of, and within the customer hosted worker node 106. The customer hosted worker node 106 can further includer a container runtime that can function as a microservice for holding the running application, associated libraries, and their dependencies.

The customer 102 can include a user terminal that functions as a user interface for interacting with virtual computation provider 114, VPC 112, customer hosted worker node 106, and/or cloud hosted master node 104. The customer 102 can further include a gateway, such as a virtual private gateway, for establishing secure communication with the VPC 112 via the network 108.

Figure 2:
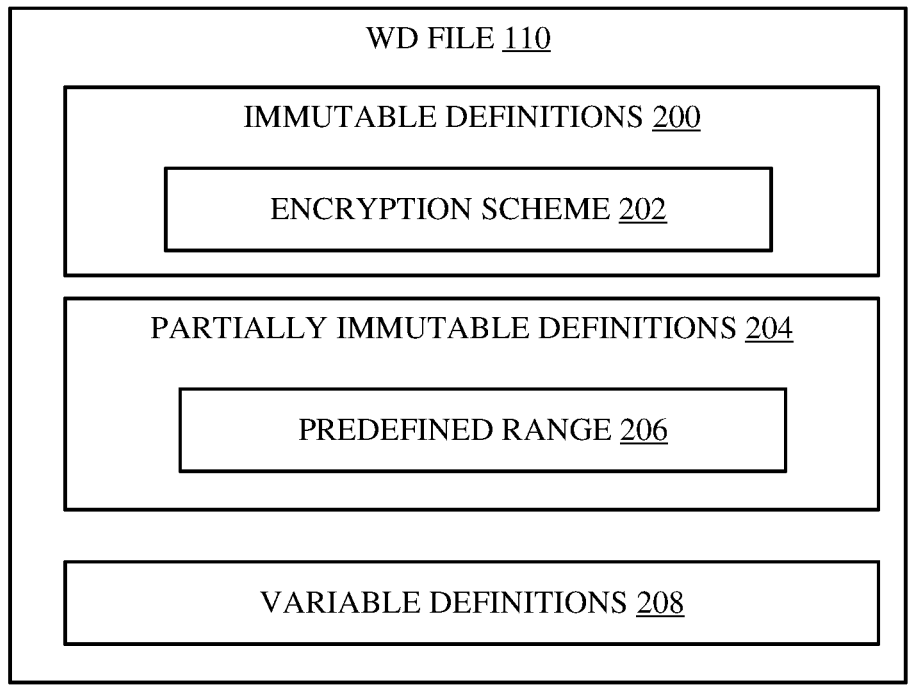
FIG. 2 illustrates an example workload definition (WD) file, in accordance with some embodiments of the present disclosure.

FIG. 2 illustrates an example WD file 110, in accordance with some embodiments of the present disclosure. WD file 110 includes one or more immutable definitions 200, one or more partially immutable definitions 204, and one or more variable definitions 208. Although referred to as definitions herein, the aforementioned can also be referred to as declarations, statements, metadata, parameters, and the like. WD file 110 can be defined using JSON, YAML, or another computer programming language.

The immutable definitions 200 are associated with an encryption scheme 202 for encrypting the immutable definitions 200. The immutable definitions 200 can refer to portions of the WD file 110 that are unalterable by the control plane. In other words, once defined by the customer 102 during development of the WD file 110, the immutable definitions 200 cannot be altered without sufficient information to decrypt the immutable definitions 200. Thus, an intermediary such as the cloud hosted master node 104 cannot alter the immutable definitions 200, thereby increasing the security of the WD file 110. One example of an immutable definition 200 is a container image name. However, numerous alternative examples of immutable definitions 200 are also possible and within the spirit and scope of the present disclosure. Generally, immutable definitions 200 refer to characteristics of WD file 110 which, if maliciously accessed and/or altered, can compromise security, privacy, safety, efficiency, effectiveness, and/or accuracy of the WD file 110 during deployment.

Encryption scheme 202 can refer to any encryption scheme now known or later developed. Encryption scheme 202 can include, but is not limited to, a symmetric key encryption scheme, an asymmetric key encryption scheme, a public-key encryption scheme, or other encryption schemes. Encryption scheme 202 can utilize algorithms such as, but not limited to, Base64, Triple Data Encryption Standard (DES), Rivest Shamir Adelman (RSA), Blowfish, Twofish, Advanced Encryption Standard (AES), or other algorithms.

Each of the partially immutable definitions 204 are associated with a respective predefined range 206, where each predefined range 206 is defined by the customer 102 and provides parameters for acceptable changes to the one or more partially immutable definitions 204 by the cloud hosted master node 104. One non-limiting example of a partially immutable definition 204 is memory allocation, where an amount of memory allocation for a certain workload should fall within an appropriate range, but which may be variable depending on the availability and capability of computational resources associated with the customer hosted worker node 106. Similarly, other non-limiting examples of partially immutable definition 204 include processor allocation, storage allocation, bandwidth (e.g., network) allocation, a time for scheduling the workload, or another value which, if modified within a predefined range, does not compromise security, efficiency, or effectiveness of the WD file 110 during deployment. Predefined range 206 can be in the form of a minimum, a maximum, a list of predefined variables (e.g., any one of {A, B, C}, etc.), a numeric range, or another parameter.

In some embodiments, the predefined range 206 is also encrypted according to the encryption scheme 202 in order to prevent a malicious cloud hosted master node 104 from altering the predefined range 206 and altering the partially immutable definition 204 to a value that satisfies the altered predefined range 206 despite not satisfying the originally defined predefined range 206.

Variable definitions 208 can refer to definitions that are alterable by the cloud hosted master node 104. Variable definitions 208 can be definitions that have limited security risks if manipulated by a malicious actor. One non-limiting example of a variable definition 208 is a container instance identifier (ID). A container instance ID that is customizable by the cloud hosted master node 104 can be beneficial insofar as it enables the cloud hosted master node 104 to consistently and accurately document container instances while orchestrating multiple workloads amongst many worker nodes. Further, container instance IDs are generally not relevant to the security of the WD file 110. As a result, container instance IDs can be classified as a variable definition 208.

Although immutable definitions 200, partially immutable definitions 204, and variable definitions 208 are shown in a same WD file 110, in some embodiments, these files are separate and may not necessarily reside within a same, discrete file. Furthermore, immutable definitions 200, partially immutable definitions 204, and/or variable definitions 208 can be manually classified based on user input by customer 102 or automatically classified based on a rules engine or machine learning algorithm. Finally, in some embodiments, immutable definitions 200 are any definitions explicitly defined by customer 102, whereas partially immutable definitions 204 and variable definitions 208 can be definitions that are not defined (e.g., empty, blank, null) by the customer 102.

Figure 3:
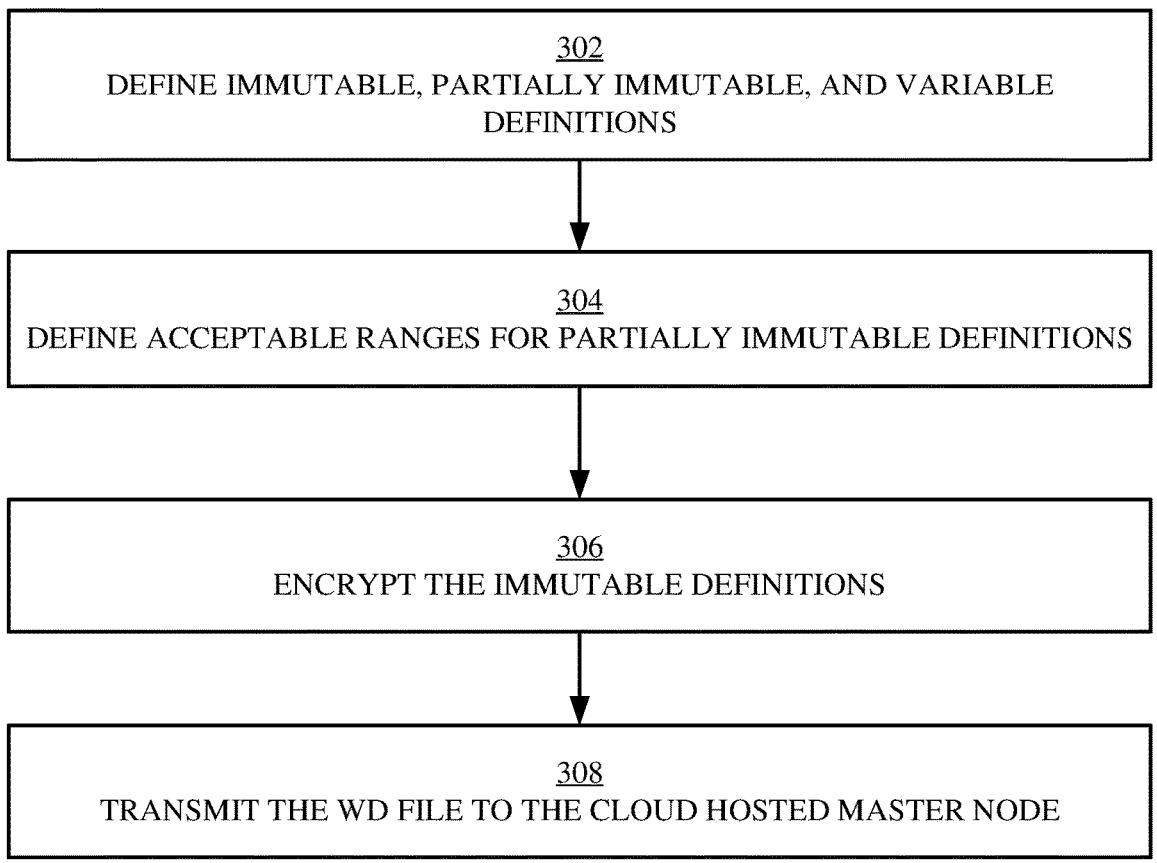
FIG. 3 illustrates a flowchart of an example method for generating a WD file, in accordance with some embodiments of the present disclosure.

FIG. 3 illustrates a flowchart of an example method 300 for generating a WD file 110 for defining a workload, in accordance with some embodiments of the present disclosure. The method 300 can be implemented by a customer 102 or a different configuration of hardware and/or software.

Operation 302 includes defining one or more immutable definitions 200, one or more partially immutable definitions 204, and one or more variable definitions 208 in the WD file 110. Defining immutable definitions 200, partially immutable definitions 204, and/or variable definitions 208 can be based on user input and/or based on automatic classifications. When utilizing automatic classifications, the automatic classifications can be generated by a rules-based system or a trained machine learning model that classifies each definition as immutable, partially immutable, or variable according to the characteristics of the definition.

Operation 304 includes defining a predefined range 206 for each of the partially immutable definitions 204. The predefined range 206 can be defined by user input or automatically generated using a rules-based system or a trained machine learning model. Predefined range 206 can be in the form of a minimum, a maximum, a list of predefined variables (e.g., any one of {A, B, C}, etc.), a numeric range, or another parameter.

Operation 306 includes encrypting the immutable definitions 200 according to the encryption scheme 202. As one non-limiting example, the immutable definitions 200 can be saved in a new document, and the new document can be encrypted using a public key of the customer 102. In some embodiments, a hash (e.g., a Base64 hash) of the immutable definitions 200 can be included in the WD file 110 as a placeholder for the immutable definitions 200 when the WD file 110 is transmitted to the cloud hosted master node 104. Replacing the immutable definitions 200 with a hash based on the immutable definitions 200 can be useful for increasing privacy of the immutable definitions 200 when the WD file 110 is sent to intermediaries such as the cloud hosted master node 104. In some embodiments, operation 306 further includes encrypting the predefined ranges 206 according to the encryption scheme 202.

Operation 308 includes transmitting the WD file 110 to the cloud hosted master node 104. The customer 102 can transfer the WD file 110 in order to have the cloud hosted master node 104 schedule the workload for deployment.

Figure 4:
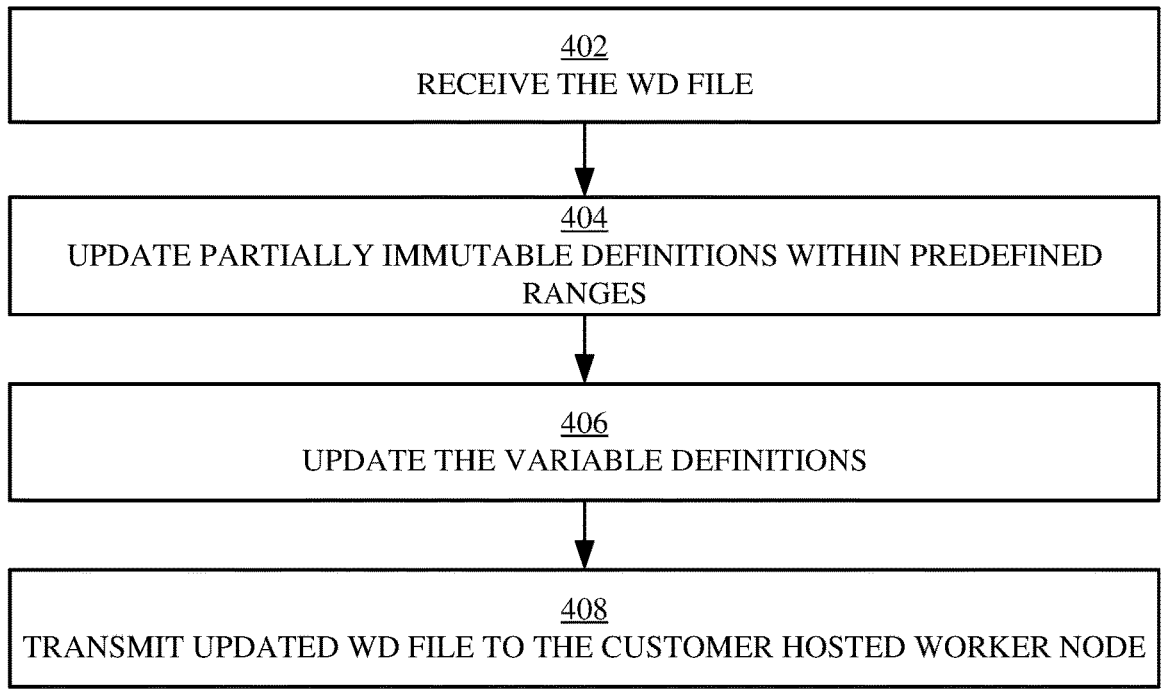
FIG. 4 illustrates a flowchart of an example method for modifying a WD file at a master node, in accordance with some embodiments of the present disclosure.

FIG. 4 illustrates an example method 400 for modifying the WD file 110 by the cloud hosted master node 104 during workload scheduling, in accordance with some embodiments of the present disclosure. The method 400 can be implemented by the cloud hosted master node 104 or a different configuration of hardware and/or software. In some embodiments, the method 400 occurs after the method 300.

Operation 402 includes receiving the WD file 110 from the customer 102. The WD file 110 can include one or more immutable definitions 200, one or more partially immutable definitions 204, and one or more variable definitions 208. The immutable definitions 200 can be encrypted according to an encryption scheme 202, and the cloud hosted master node 104 is unable to decrypt, alter, and/or read the immutable definitions 200. Meanwhile, the partially immutable definitions 204 are each associated with a predefined range 206.

Operation 404 includes updating the partially immutable definitions 204 within the respective predefined ranges 206, and operation 406 includes updating the variable definitions 208. As one example, operation 404 can include altering (or defining in instances where the partially immutable definition 204 is originally undefined) a partially immutable definition 204 such as a memory allocation value within a predefined range 206 of acceptable memory allocation values. As another example, operation 406 can include changing (or defining in instances where the variable definition 208 is originally undefined) a variable definition 208 such as a container instance ID.

Each of operations 404 and 406 can include the cloud hosted master node 104 accessing control plane information to appropriately alter or define various definitions in WD file 110. For example, the cloud hosted master node 104 can retrieve information such as, but not limited to, available computational resources, deployed computational resources, container information, cluster information, zone information, partition information, and the like. This information can be used to appropriately modify the partially immutable definitions 204 and/or the variable definitions 208 in WD file 110 in accordance with the orchestration protocol utilized by the cloud hosted master node 104.

Operation 408 includes transmitting the updated WD file 110 to the customer hosted worker node 106 for deployment at the customer hosted worker node 106. In other words, operation 408 can include scheduling the workload by transmitting the modified WD file 110 to the customer hosted worker node 106 that is scheduled to deploy the workload.

Figure 5:
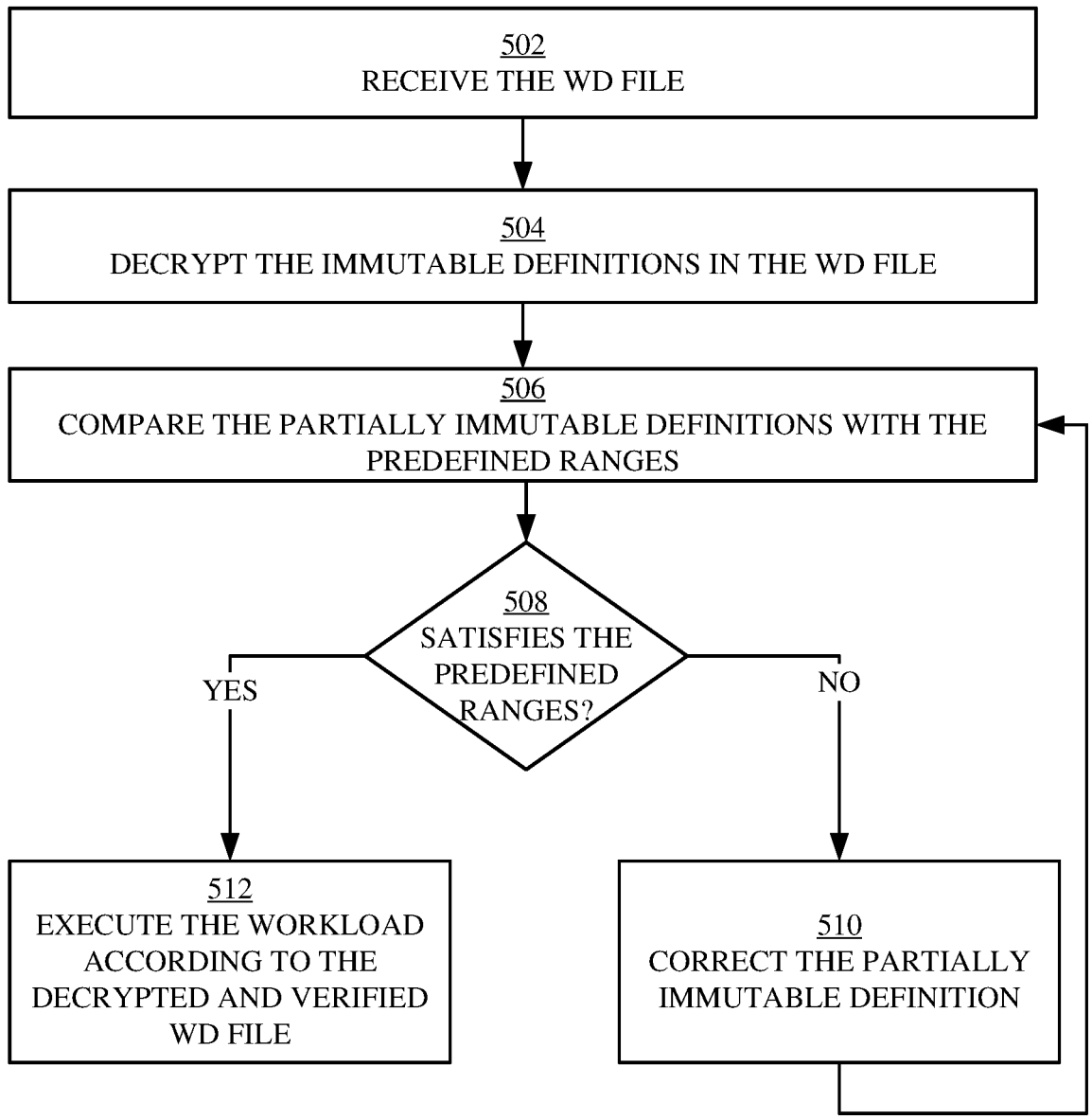
FIG. 5 illustrates a flowchart of an example method for deploying a workload according to a modified WD file at a worker node, in accordance with some embodiments of the present disclosure

FIG. 5 illustrates a flowchart of an example method 500 for deploying a WD file 110 on the customer hosted worker node 106, in accordance with some embodiments of the present disclosure. In some embodiments, the method 500 is implemented by a customer hosted worker node 106 or a different configuration of hardware and/or software. In some embodiments, the method 500 occurs after the method 400.

Operation 502 includes receiving the WD file 110 at the customer hosted worker node 106 and from the cloud hosted master node 104. The WD file 110 can include one or more immutable definitions 200, one or more partially immutable definitions 204, and one or more variable definitions 208. The one or more immutable definitions 200 can be defined by the customer 102 and encrypted according to an encryption scheme 202. The one or more partially immutable definitions 204 can be defined by the customer 102, and each partially immutable definition 204 can be associated with a respective predefined range 206 that is also defined by the customer 102. In some embodiments, the one or more partially immutable definitions 204 are modified by the cloud master node 104 to an updated value. The one or more variable definitions 208 can be originally defined by the customer 102, and the one or more variable definitions 208 can also be updated by the cloud hosted master node 104 to any value chosen by the cloud hosted master node 104.

Operation 504 includes decrypting the immutable definitions 200 in the WD file 110. Decrypting the immutable definitions 200 can be performed by utilizing privately shared information between the customer 102 and the customer hosted worker node 106, where the cloud hosted master node 104 does not have access to the privately shared information. The privately shared information can include, for example, a password, information related to the encryption scheme 202, a key (e.g., a public key, a private key, a secret key, etc.), or other privately shared information useful for decrypting the immutable definitions 200. For example, the customer hosted worker node 106 can store a key (e.g., a public key) associated with the customer 102 that is leasing the customer hosted worker node 106 and that is suitable for decrypting the immutable definitions 200. As another example, the customer hosted worker node 106 can retrieve a public key or secret key from the customer 102 upon receiving the WD file 110, where the public key or secret key can be transmitted from the customer 102 to the customer hosted worker node 106 using a secure connection, such as a VPN connection. In some embodiments, operation 504 also includes decrypting the predefined ranges 206 associated with the partially immutable definitions 204, in embodiments where the predefined ranges 206 are encrypted (e.g., as part of operation 306 of FIG. 3).

Operation 506 includes comparing each of the partially immutable definitions 204 to its respective predefined range 206. As previously discussed, the predefined range 206 can be a minimum, maximum, list, numeric range, or another parameter. Operation 508 can include determining if the value of each partially immutable definition 204 satisfies its corresponding predefined range 206.

If any one of the partially immutable definitions 204 includes a value that does not satisfy its corresponding predefined range 206 (508: NO), then the method 500 proceeds to operation 510 and corrects the one or more partially immutable definitions 204 that do not satisfy the predefined ranges 206. For example, operation 510 can include returning the WD file 110 to the cloud hosted master node 104 (or the customer 102) with identification of the inappropriate value in one or more partially immutable definitions 204. As another example, operation 510 can include automatically correcting the inappropriate partially immutable definition 204 by changing the value to a nearest acceptable value. In this example, if the value exceeds a maximum value defined in the predefined range 206, then operation 510 can alter the non-compliant value to the maximum value. Regardless of how the deficiency is corrected, the method 500 can return to operation 506 to compare the partially immutable definitions 204 to the predefined ranges 206.

In the event that each of the partially immutable definitions 204 satisfies their respective predefined ranges 206 (508: YES), the method 500 proceeds to operation 512. Operation 512 includes executing the workload according to the decrypted and verified WD file 110. Advantageously, the WD file 110 used to execute the workload realizes improved security insofar as the immutable definitions 200 are unalterable by the cloud hosted master node 104 and the partially immutable definitions 204 are alterable by the cloud hosted master node 104 only within predefined ranges 206 defined by the customer 102. Thus, aspects of the present disclosure limit use of the cloud hosted master node 104 (and, by extension, the virtual computation provider 114) as an attack vector to corrupt a WD file 110 configured to deploy a workload in a VPC 112.

Figure 6:
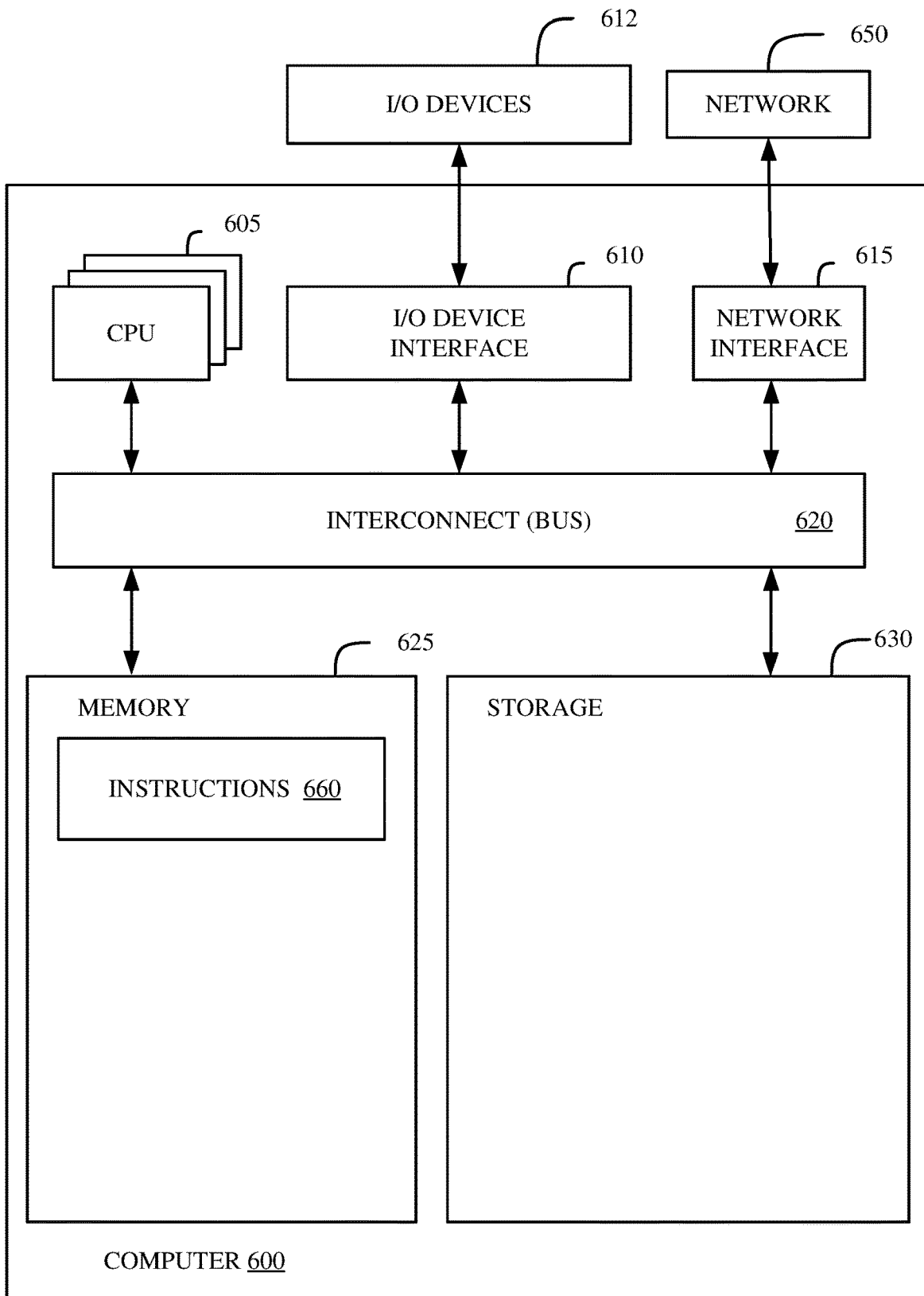
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform the methods described in any one or more of FIGS. 3-5 and/or implement the functionality discussed in FIGS. 1-2. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) any one or more of customer 102, cloud hosted master node 104, and/or customer hosted worker node 106.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be processor-executable instructions for performing any portion of, or all of, any of the methods of FIGS. 3-5 and/or implementing any of the functionality discussed in FIGS. 1-2.

Although not explicitly shown, storage 630 can include a WD file 110. The WD file 110 can include any or all of the elements discussed in FIG. 2, such as, but not limited to, one or more immutable definitions 200 (with an associated encryption scheme 202), one or more partially immutable definitions 204 (with corresponding predefined ranges 206), and/or one or more variable definitions 208.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
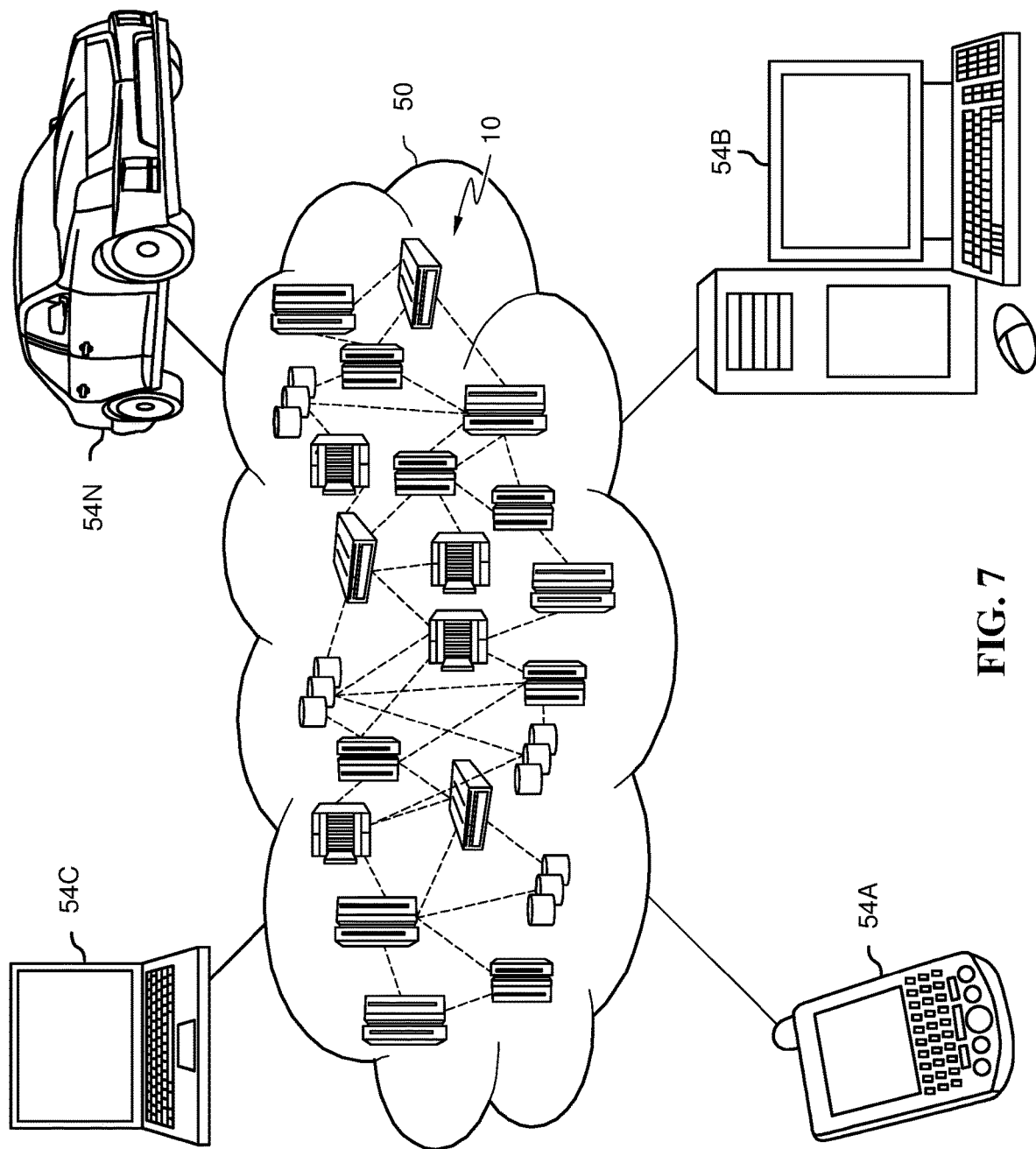
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
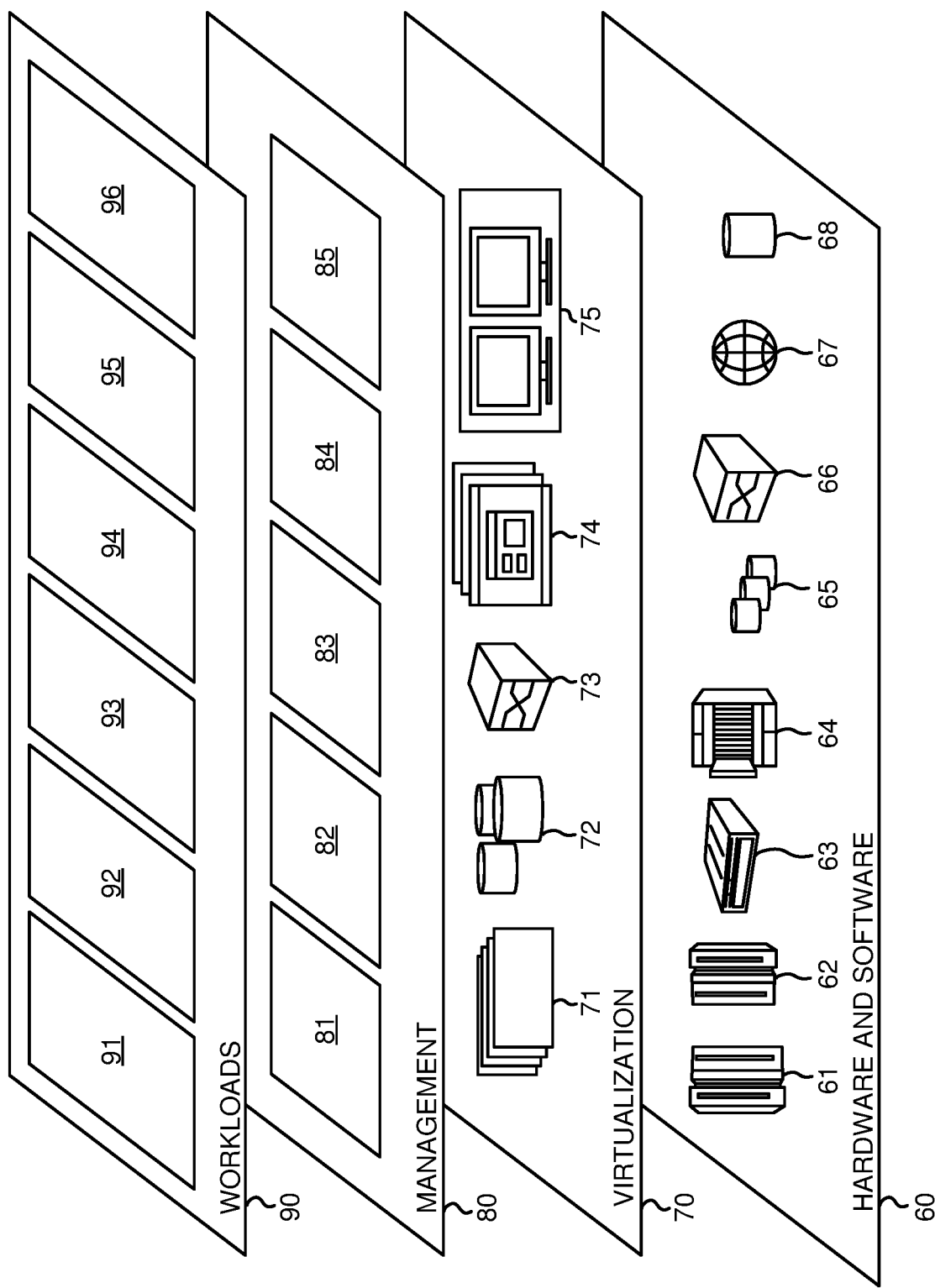
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. In some embodiments, management layer 80 can include functionality enabling a customer 102 to create immutable, partially immutable, and/or variable definitions in a WD file 110.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure workload configuration 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 3-5 and/or any of the functionality discussed in FIGS. 1-2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A processor-implemented method comprising:
receiving a workload definition file at a worker node and from a master node, wherein the workload definition file comprises:
an encrypted immutable definition;
a partially immutable definition with a predefined range of values and a first value modified by the master node; and
a variable definition with a second value modified by the master node;
decrypting, by the worker node, the encrypted immutable definition to generate a decrypted immutable definition;
verifying, by the worker node, that the first value satisfies the predefined range of values; and
in response to decrypting the encrypted immutable definition and verifying that the first value satisfies the predefined range of values, executing a workload based on the workload definition file in a virtual computing environment.

2. The method of claim 1, wherein the worker node resides in a Virtual Private Cloud (VPC), and wherein the master node resides in control plane managing multiple Virtual Private Clouds.

3. The method of claim 1, wherein the encrypted immutable definition is unalterable by the master node.

4. The method of claim 1, wherein the encrypted immutable definition comprises a container image name.

5. The method of claim 1, wherein the encrypted immutable definition is encrypted using a public key of a customer leasing the worker node.

6. The method of claim 1, wherein the partially immutable definition comprises a memory allocation.

7. The method of claim 1, wherein the variable definition comprises a container instance identifier.

8. A system comprising:
a processor; and
a computer-readable storage medium storing program instructions which, when executed by the processor, are configured to cause the processor to perform a method comprising:
receiving a workload definition file at a worker node and from a master node, wherein the workload definition file comprises:
an encrypted immutable definition;
a partially immutable definition with a predefined range of values and a first value modified by the master node; and
a variable definition with a second value modified by the master node;
decrypting, by the worker node, the encrypted immutable definition to generate a decrypted immutable definition;
verifying, by the worker node, that the first value satisfies the predefined range of values; and
in response to decrypting the encrypted immutable definition and verifying that the first value satisfies the predefined range of values, executing a workload based on the workload definition file in a virtual computing environment.

9. The system of claim 8, wherein the worker node resides in a Virtual Private Cloud (VPC), and wherein the master node resides in control plane managing multiple Virtual Private Clouds.

10. The system of claim 8, wherein the encrypted immutable definition is unalterable by the master node.

11. The system of claim 8, wherein the encrypted immutable definition comprises a container image name.

12. The system of claim 8, wherein the encrypted immutable definition is encrypted using a public key of a customer leasing the worker node.

13. The system of claim 8, wherein the partially immutable definition comprises a memory allocation.

14. The system of claim 8, wherein the variable definition comprises a container instance identifier.

15. A computer program product comprising a non-transitory computer readable storage medium having program instructions embodied therewith, the program instructions executable by a processor to cause the processor to perform a method comprising:
receiving a workload definition file at a worker node and from a master node, wherein the workload definition file comprises:
an encrypted immutable definition;
a partially immutable definition with a predefined range of values and a first value modified by the master node; and
a variable definition with a second value modified by the master node;
decrypting, by the worker node, the encrypted immutable definition to generate a decrypted immutable definition;
verifying, by the worker node, that the first value satisfies the predefined range of values; and
in response to decrypting the encrypted immutable definition and verifying that the first value satisfies the predefined range of values, executing a workload based on the workload definition file in a virtual computing environment.

16. The computer program product of claim 15, wherein the worker node resides in a Virtual Private Cloud (VPC), and wherein the master node resides in control plane managing multiple Virtual Private Clouds.

17. The computer program product of claim 15, wherein the encrypted immutable definition is unalterable by the master node.

18. The computer program product of claim 15, wherein the encrypted immutable definition comprises a container image name.

19. The computer program product of claim 15, wherein the encrypted immutable definition is encrypted using a public key of a customer leasing the worker node.

20. The computer program product of claim 15, wherein the partially immutable definition comprises a memory allocation, and wherein the variable definition comprises a container instance identifier.

* * * * *